(12) United States Patent  
Dalton et al.

(10) Patent No.: US 6,679,126 B2  
(45) Date of Patent: Jan. 20, 2004

(54) SYSTEM AND METHOD FOR MEASURING TORQUE USING FILTRATION OF LIGHT TO DETECT ANGULAR DISPLACEMENT OF A PAIR OF WHEELS

(75) Inventors: Bruce Dalton, Cornish, ME (US); Timothy Coste, Standish, ME (US)

(73) Assignee: Control Devices, Standish, ME (US)

( * ) Notice: Subject to any disclaimer, the term of this patent is extended or adjusted under 35 U.S.C. 154(b) by 137 days.

(21) Appl. No.: 09/902,238

(22) Filed: Jul. 10, 2001

(65) Prior Publication Data

US 2003/0010137 A1 Jan. 16, 2003

(51) Int. Cl.⁷ .................................................. G01L 3/14
(52) U.S. Cl. ............................................. 73/862.324
(58) Field of Search ................ 250/231.13; 73/862.324, 73/862.33, 54.32, 136 R, 133 R, 862.321, 862.327, 862.328, 862.329

(56) References Cited

U.S. PATENT DOCUMENTS

| | | | | |
|---|---|---|---|---|
| 3,921,445 A | * | 11/1975 | Hill et al. ................ 73/133 R |
| 4,152,930 A | * | 5/1979 | Fujimoto et al. .......... 73/136 R |
| 4,693,123 A | * | 9/1987 | Bacardit .................. 73/862.33 |
| 5,600,058 A | * | 2/1997 | Preikschat et al. ......... 73/54.32 |
| 5,606,137 A | * | 2/1997 | Penketh .................. 73/862.324 |
| 5,841,132 A | * | 11/1998 | Horton et al. ........... 250/231.13 |
| 5,969,269 A | | 10/1999 | Munyon et al. |
| 6,085,600 A | | 7/2000 | Herve |

* cited by examiner

Primary Examiner—Edward Lefkowitz
Assistant Examiner—Octavia Davis
(74) Attorney, Agent, or Firm—Woodard, Emhardt, Moriarty, McNett & Henry LLP (57) ABSTRACT

A system for measuring torque comprises a pair of drive shafts connected by a torsion bar, a wheel affixed to each of the drive shafts and having at least one slot cut through it, a light source positioned on the side of one of the wheels opposite the other, and a light detection device on the opposite side of the other wheel positioned to detect light from the light source which passes through the slots in both wheels. The slots are positioned in the wheels such that the light that can pass from the light source, through both wheels, and to the detector changes as the angular position of the wheels changes relative. The light detection device observes the changes in this pattern of light to produce a signal indicative of the torque on the drive shaft that is producing the observed angular displacement of the wheels.

32 Claims, 4 Drawing Sheets

SYSTEM AND METHOD FOR MEASURING TORQUE USING FILTRATION OF LIGHT TO DETECT ANGULAR DISPLACEMENT OF A PAIR OF WHEELS

TECHNICAL FIELD OF THE INVENTION

The present invention generally relates to the measurement of torque, and more particularly to a system and method for measuring torque using filtration of light to detect angular displacement of a pair of wheels.

BACKGROUND OF THE INVENTION

In most mechanical applications, mechanical power is transferred in the form of torque. Typically, one end of an at least partially rigid shaft is rotated, causing the opposite end to rotate in turn, thereby transferring the mechanical power from one end of the shaft to the other end. Drive shafts are frequently substantially rigid, so that the two ends rotate at substantially the same time and angular speed. However, many drive shafts include a relatively flexible portion, which permits a substantially increased angular displacement between the ends of the drive shaft at a given torque. Such relatively flexible portions are often known as "torsion bars," and may be included, for example, in order to give a softer feel in applications where the driving torque is supplied by a human operator. One example of a common application is in the steering column of an automobile.

Torque-measuring devices are used in many applications to observe the torque being applied to a drive shaft. In particular, torque-measuring devices are used in many applications in automobiles. One reason it may be useful to measure torque is that such drive shafts may be prone to failure when exposed to excessive torque, or when exposed to moderate torque for extended periods. High-speed torque transmission can result in premature failure of a drive shaft caused by uncorrected flexing of one or more members of the drive train, for another example. Yet another reason it may be useful to observe the torque on a drive shaft is to ensure safe operation of the mechanism being driven. For example, if the torque on a drive shaft used to roll up a power window suddenly and greatly increases, it may be because someone or something has been caught between the window and the doorframe. A torque detector may therefore be used to interrupt the power to the drive shaft, to prevent injury to a person or damage to the window.

Torque-measuring devices typically measure an angular displacement, which is then related back to a torque through a calibration of the detector. Some methods for measuring displacement are strain gauges, magnetism, and optics. Once this displacement is measured, it is necessary to transmit a signal from the shaft—which may be rotating at a high angular velocity—to appropriate electronics for acquisition and processing. Some of the means of transmission are hardwiring (suitable only for stationary shafts), RF, magnetic, and optical. Whatever mechanism is used, it must typically be a separate system from that used to observe the angular displacement.

Such torque-measuring devices sometimes detect the angular displacement by using of a pair of wheels or similar apparati, affixed to coaxial drive shaft portions, which are permitted to angularly displace with respect to one another with torsion of the shaft. The wheels are more or less perpendicular to the axis of the drive shaft, and bear some means of encoding their positions relative to one another. Such encoding means sometimes include a magnetic field, optical reflectors, or other elements which must be separately constructed and affixed to the wheels. Therefore, systems employing such means are more expensive and less reliable. Also, the position of each wheel is often observed independently, and then the two positions are compared. Such systems require two position-detection mechanisms, and so are more expensive and less reliable than a system in which the position of one wheel relative to the other can be made with a single sensor.

Therefore there is a need for a system for detecting torque in a drive shaft that is inexpensive and reliable. The present invention is directed towards meeting that need, amongst others.

SUMMARY OF THE INVENTION

A system and method for measuring torque according to the present invention comprises a pair of drive shaft segments connected by a torsion bar, a wheel affixed to each of the drive shaft segments and having at least one slot cut through it, a light source positioned on the side of one of the wheels opposite the other, and a light detection device on the opposite side of the other wheel positioned to detect light from the light source which passes through the slots in both wheels. The slots are positioned in the wheels such that the pattern of light that can pass from the light source, through both wheels and to the detector, changes as the angular position of the wheels changes relative to one another. The light detection device observes the changes in this pattern of light to produce a signal indicative of the torque on the drive shaft that is producing the observed angular displacement of the wheels relative to one another.

A first embodiment system for detecting angular displacement in a shaft comprises: a first rotating member, having a first slit pattern therethrough, and being affixed to the shaft; a second rotating member, having a second slit pattern therethrough, and being affixed to the shaft; a light source positioned on a side of said first rotating member opposite said second rotating member; and a light detector positioned on a side of said second rotating member opposite said first rotating member such that light from said light source which would otherwise be incident on said light detector is substantially blocked by said first and second rotating members, except for light which passes through said first and second slit patterns. Said first and second slit patterns are adapted to create a pattern of light incident on said light detector that varies according to an angular position of said first rotating member relative to said second rotating member; and said light detector is adapted to produce a position signal responsive to a position of said pattern of light incident on said light detector.

A second embodiment system for detecting angular displacement between a first position and a second position on a shaft comprises: a first rotating member, having a first slit pattern therethrough and being affixed to said first position on the shaft, the first slit pattern consisting of a series of identical first slits regularly spaced about an axis of rotation of said shaft, and each of said first slits running both radially and angularly, relative to an origin of a set of radial coordinates located on an axis of rotation of the shaft; a second rotating member, identical to said first wheel and affixed to said second position on the shaft, but oriented to face in the opposite direction along said shaft relative to said first rotating member; a light source positioned on a side of said first rotating member opposite said second rotating member; and a position sensitive device positioned on a side of said second rotating member opposite said first rotating member such that light from said light source which would otherwise be incident on said light detector is substantially blocked by said first and second rotating members, except for light which passes through said first and second slit patterns. Said first and second slit patterns are adapted to create a pattern of light incident on said light detector that varies according to an angular position of said first rotating member relative to said second rotating member; and said light detector is adapted to produce a position signal responsive to a position of a centroid of said pattern of light incident on said light detector.

A third embodiment system for measuring the angular displacement between a first and second positions on a shaft comprises: a first rotating member, having a first slit pattern therethrough and being affixed to said first position on the shaft, the first slit pattern consisting of a series of identical first slits regularly spaced about an axis of rotation of said shaft, and each of said first slits running both radially and angularly, relative to an origin of a set of radial coordinates located on an axis of rotation of the shaft; a second rotating member, identical to said first wheel and affixed to said second position on the shaft, but oriented to face in the opposite direction along said shaft relative to said first rotating member; a light source positioned on a side of said first rotating member opposite said second rotating member; and a position sensitive device positioned on a side of said second rotating member opposite said first rotating member such that light from said light source which would otherwise be incident on said light detector is substantially blocked by said first and second rotating members, except for light which passes through said first and second slit patterns. Said first and second slit patterns are adapted to create a pattern of light incident on said light detector that varies according to an angular position of said first rotating member relative to said second rotating member; and said light detector is adapted to produce a position signal responsive to a position of a centroid of said pattern of light incident on said light detector. The system further comprises a circuit adapted to convert said position signal into a displacement signal corresponding to the angular displacement between said first and second rotating members that has been determined to produce a pattern of light having the position corresponding to said position signal.

A fourth embodiment system for measuring torque in a shaft comprises: a first rotating member, having a first slit pattern therethrough, the first slit pattern consisting of a series of identical first slits regularly spaced about an axis of rotation of said shaft, and each of said first slits running both radially and angularly, relative to an origin of a set of radial coordinates located on an axis of rotation of the shaft; a second rotating member, identical to said first wheel, but oriented to face in the opposite direction along said shaft relative to said first rotating member; a light source positioned on a side of said first rotating member opposite said second rotating member; a position sensitive device positioned on a side of said second rotating member opposite said first rotating member such that light from said light source which would otherwise be incident on said light detector is substantially blocked by said first and second rotating members, except for light which passes through said first and second slit patterns; and a circuit adapted to convert said position signal into a torque signal corresponding to the torque that has been determined to produce a pattern of light having the position corresponding to said position signal.

A first embodiment method of detecting angular displacement between a first position and a second position on a shaft comprises: providing a first rotating member affixed to the first position and a second rotating member affixed to the second position, each of the first and second rotating members having at least one slit therethrough; determining a relationship between angular displacement between the first and second positions and a pattern of light produced by filtration of substantially planar light through at least one slit in each of the first and second rotating members; and observing the pattern of light to determine the angular position of the first rotating member relative to the second rotating member.

A second embodiment method of detecting torque in a shaft comprises: providing a first rotating member and a second rotating member each having at least one slit therethrough; determining a relationship between a torque on the shaft and a pattern of light produced by filtration of substantially planar light through at least one slit in the first rotating member and at least one slit in the second rotating member; and observing the pattern of light to determine the angular position of the first rotating member relative to the second rotating member.

A third embodiment method of measuring torque in a shaft, comprises: providing a first rotating member and a second rotating member each having at least one slit therethrough; determining a relationship between a torque on the shaft and a pattern of light produced by filtration of substantially planar light through at least one slit in the first rotating member and at least one slit in the second rotating member; observing the pattern of light to determine the angular position of the first rotating member relative to the second rotating member; relating the angular position of the first rotating member relative to the second rotating member back to a torque on the shaft using the relationship. The observing the pattern of light is substantially limited to observing a radial position of the pattern of light relative to an axis of rotation of said first and second rotating members.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
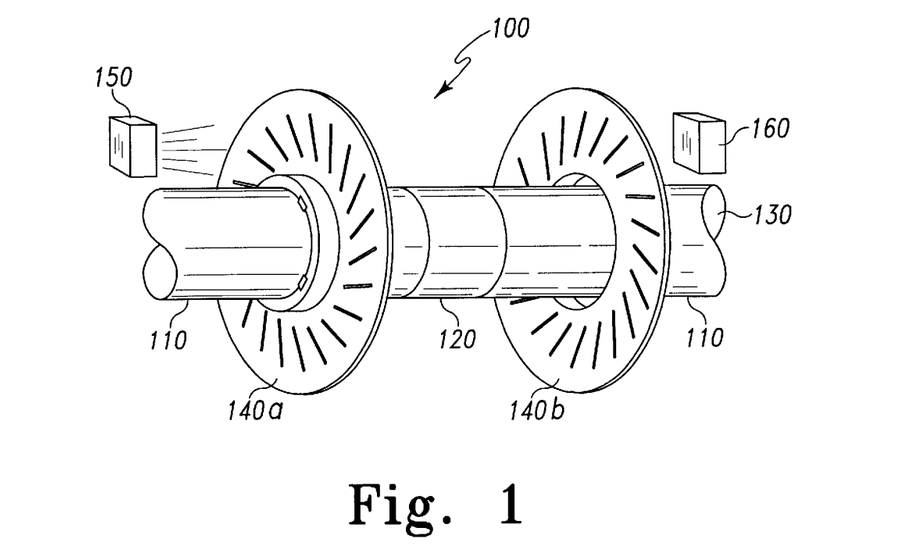
FIG. 1 is a perspective view of a preferred embodiment system according to the present invention.

FIG. 1 illustrates certain elements of a preferred embodiment system for detecting torque according to the present invention, indicated generally at 100. A drive shaft 130 comprises a pair of coaxial drive shaft segments 110 connected to one another by a torsion bar 120. As will be familiar to those skilled in the art, a torsion bar 120 is a relatively flexible portion of a drive shaft that permits a relatively large displacement of the drive shaft segments 110 with respect to one another when the drive shaft 130 experiences a given torque. Although drive shaft 130 preferably includes a torsion bar 120, it is contemplated that any drive shaft 130 which experiences sufficient angular displacement per unit distance along its length under the range of torque to be detected may be used. Affixed to the drive shaft segments 110 are a first rotating member 140a and a second rotating member 140b. In certain embodiments the first and second rotating members 140 are wheels. Because they are affixed to the drive shaft 130, the rotating members 140 have an angular position relative to one another that matches the angular position of the circumference of the drive shaft 130 at the places where the rotating members 140 are respectively attached. A light source 150 and a light detector 160 are positioned on opposite sides of the rotating members 140, such that the rotating members 140 substantially block the light path between them. The rotating members 140 have patterns of slits 142 (see FIG. 2) therethrough which permit some of the light from the light source 150 to reach the light detector 160, in order to indicate the angular position of the first wheel 140a relative to the second wheel 140b.

Figure 2:
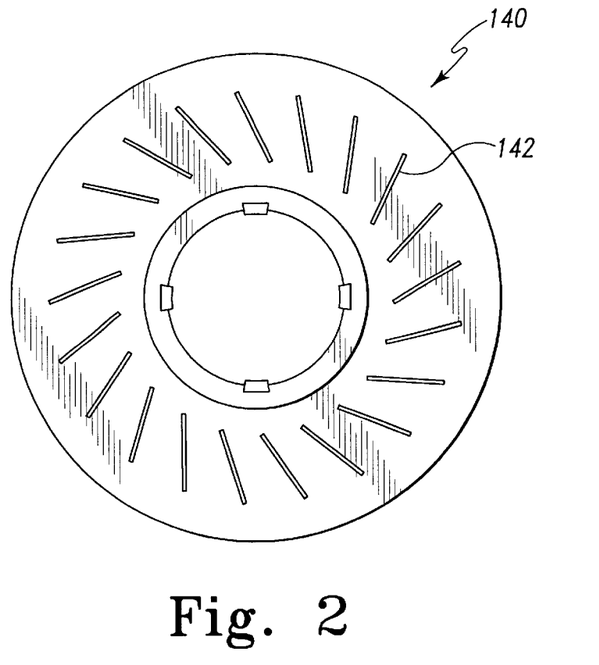
FIG. 2 is a plan view of a wheel suitable for using in the system of FIG. 1.

FIG. 2 illustrates further details of a wheel suitable for use as one of the rotating members 140 in a preferred embodiment system 100. The wheel 140 is substantially opaque to the light from light source 150, but has a pattern of regularly spaced slots 142 that permits light to pass through. The slots run in both the radial and the angular directions, relative to a set of radial coordinates having an origin at the axis of rotation of the wheel 140. In certain embodiments, the second wheel 140b is identical to the first wheel 140a, but is placed on the drive shaft 130 facing the opposite direction. One advantage of such embodiments is that the system can be constructed using only a single type of wheel, reducing the overall number of types of parts that need to be manufactured. In other embodiments, the pattern of slots 142 varies between the wheels 140a and 140b, though the number of slots 142 in each is preferably the same, and preferably they are similarly spaced about each wheel 140. Each slot 142 in either one of the wheels 140 also preferably has the same shape and orientation as each other slot 142 in that wheel 140 relative to a set of radial coordinates having an origin at the axis of rotation of the wheel. This ensures that each slit 142 in the first wheel 140a has a corresponding slit 142 in the second wheel 140b, such that the pairs of corresponding slit 142 produce a pattern of light from the light source 150 incident on the light detector 160 comprising one or more discreet shapes which all respond to angular displacement between the wheels 140 in the same way. In certain of these embodiments, the slit 142 in one of the wheels 140 run only in the radial direction. One advantage of such embodiments is that the pattern of light produced by the slits 142 cannot move in the angular direction relative to such a wheel when the angular position of the wheels 140 changes relative to one another. It will be appreciated that any two patterns of slit 142 in the wheels 140 may be used, so long as the rate of change of the angular coordinate of a slit 142 in the first wheel 140a as a function of the radial coordinate (relative to an origin on the axis of rotation of the drive shaft 130) is different from the rate of change of the angular coordinate as a function of the radial coordinate in the corresponding slit 142 in the second wheel 140b at each point along the corresponding slit 142s' length sharing a common radial coordinate. This condition guarantees that the radial coordinate of the intersection of the corresponding slits 142 will vary as the angular displacement between the wheels 140 varies.

Figure 3:
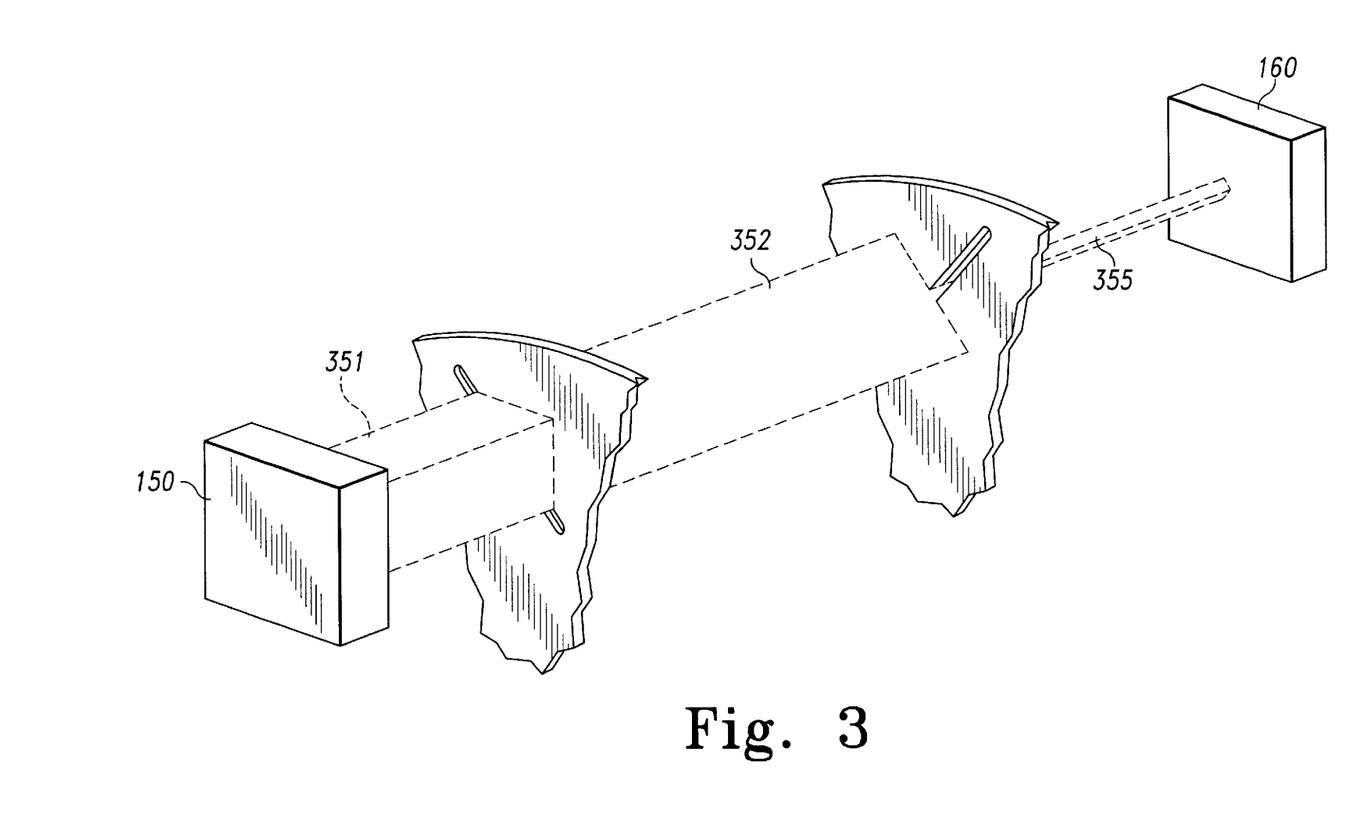
FIG. 3 is an illustration of the filtration of light by the slots in the wheels shown FIGS. 1 and 2.

FIG. 3 illustrates the filtration of light from the light source 150 by identical wheels 140 facing opposite directions along the shaft 130. By reversing the facing of the wheels relative to one another, the rate of change of the angular coordinate of a slit 142 as a function of the radial coordinate in one wheel will equal the rate of change in the other wheel times negative one. Thus, the rate of change in the two wheels will be different everywhere it does not equal zero. Substantially planar light 351 incident on each slit 142 of the first wheel 140a is filtered to produce a substantially linear light footprint 352, which is then incident on the second wheel 140b. Because the second wheel 140b faces in the opposite direction along the drive shaft 130, slits 142 in the second wheel 140b slant in the opposite direction. Therefore, a substantially parallelogram-shaped light footprint 355 is produced having a width substantially the same as the width of the slits 142. In this way, light from the light source 150 is filtered by the slits 142 in the wheels to produce a small light footprint 355 (consisting of one or more of the small parallelograms) on the light detector 160.

Figure 5:
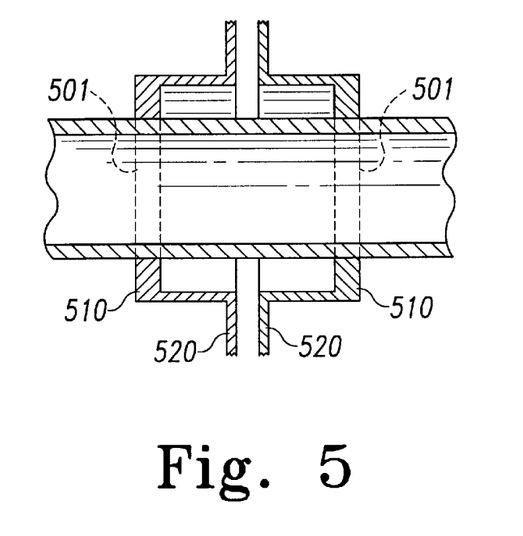
FIG. 5 is a cross-section of a certain alternative embodiment rotating members and a shaft upon which they are mounted.

Because light diffuses, the distance between the first wheel 140a and the second wheel 140b is advantageously minimized. However, because the response is increased as the angular displacement between the wheels 140 increases it is helpful to have them affixed to the shaft 130 at positions that are separated some distance from each other. In order to accommodate these competing goals, certain preferred embodiment systems 100 use rotating members 140 shaped to have a mounting portion 510 and a wheel portion 520 that is positioned some distance from the position 501 along the shaft to which the mounting portion is coupled. An example of such rotating members is illustrated in FIG. 5. In this way, the rotating members 140 can be coupled to positions 501 along the shaft 130 that are some distance from each other, but can place the rotating members 140 as close to one another as is desired.

Figure 4A:
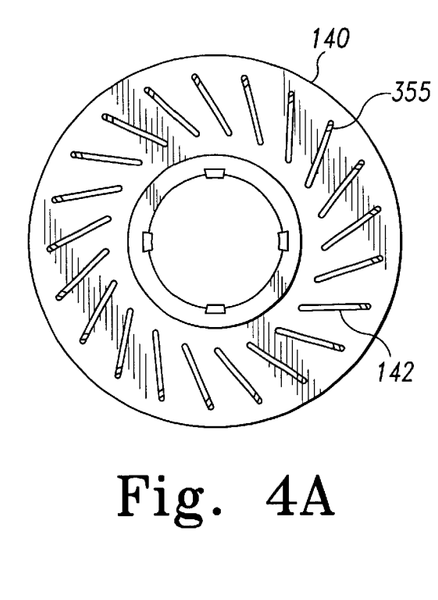
FIGS. 4A–C illustrate the variation in the pattern of light which passes through the slots in both wheels as the angular position of the wheels changes relative to each other.
Figure 4B:
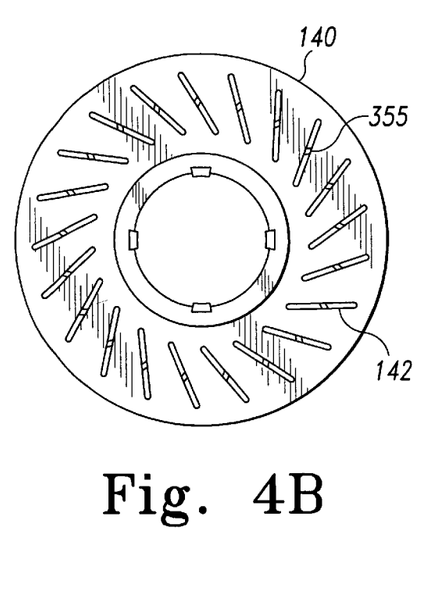
Figure 4C:
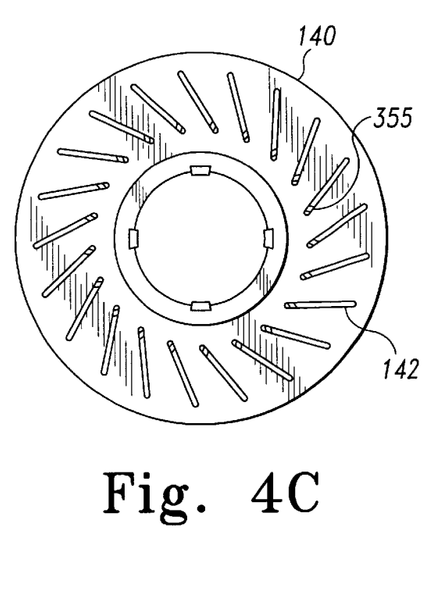

FIGS. 4A–C. illustrate how the pattern of light produced by filtration through the wheels 140 changes when the angular position of the first wheel 140a changes with respect to the second wheel 140b. FIGS. 4A and 4C illustrate the pattern of light, made up of light footprints 355, when the wheels 140 are at two extreme angular positions relative to one another. FIG. 4B illustrates a pattern of light produced by the wheels in an intermediate angular position relative to one another. As FIGS. 4A–C show, as the torque changes from one extreme to the other, the light footprints 355 move in the radial direction. Ideally, the pattern of slits 142 in the wheels 140 is selected based on the range of anticipated torque the system 100 is expected to measure, such that, at one extreme torque, the light footprints 355 are produced by the intersection of outermost portions of the slits 142, while at the other extreme torque they are produced by innermost portions. It will be appreciated that the angular displacement produced by torque on the drive shaft must also be considered in selecting the pattern of slits 142 to achieve this goal. Depending on the spacing of the slits 142, if the angular displacement between the wheels exceeds these parameters, either no light footprints 355 will be produced, or new pairs of corresponding slits 142 will intersect to create light footprints 355 indistinguishable from those normally corresponding to a different torque. If the slits 142 are regularly spaced, a regularly repeating pattern of light footprints 355 will be produced as the angular displacement of the wheels continues to increase. In particular, the torsion bar generally must not permit angular displacement of the wheels greater than $2\pi/n$ radians over the expected range of torque to be measured, where n is the number of slots in each wheel, because the pattern of light produced will repeat itself after this much angular displacement. However, in certain embodiments, this may be acceptable. For example, if the principle concern is with the rate of change of torque, the actual torque may not be of concern. Alternatively, a system 100 may include other means of distinguishing between different torques that produce the same light pattern. In such embodiments, the system 100 would function, in effect, as a refinement to a torque measurement for some other torque measuring system.

The light detector 160 is preferably a position sensitive device ("PSD") such as the SD 150-7448, manufactured by Advanced Photonics Inc., of Camarillo, Calif., (805) 987-0146. The PSD 160 is preferably positioned with a detection axis aligned radially relative to the drive shaft 130. Position sensitive devices have at least two electrodes, and generate an output current on each in response to the location of the centroid of illumination along its detection axes. A centroid of a light pattern incident on its detection element and directed at its center will cause the detector to send an equal amount of current from its electrodes. As the centroid of light is moved toward one end of a detection axis, the current from one electrode will increase and the current from the opposite electrode will decrease. By measuring the two currents and determining their ratio, the location, relative to the detection axis defined by those electrodes, of the centroid of the light footprint falling on the position sensitive device 160 can be determined.

In certain alternative embodiments, the light detector 160 is a CCD. It will be appreciated that any suitable method of detecting the locus of the light footprint may be used.

In the system 100, the drive shaft may be rotating at a relatively high rate, causing the pattern of light to rotate. Typically, the light detector 160 will be stationary. Therefore, as the light pattern rotates in relation to the PSD 160, a series of light footprints 355 will appear at one edge of the detector and move in an arc to the other edge. Because the axes of a PSD are typically linear, while the light footprints 355 are moving in an arc, one component of their position will change slightly, causing the measured angular displacement of the wheels 140 to appear to be a rectified sine wave even when the wheels 140 are stationary with respect to each other. There are a number of ways to resolve this problem.

Some position sensitive devices have four electrodes, and are therefore able to produce a signal which indicates the location of the centroid of a light pattern with respect to two coordinates. Although the raw response of each of electrodes is generally linear with respect to motion of the centroid in Cartesian coordinates, the Cartesian coordinates can easily be converted to radial coordinates to extract the radial position of the rotating light footprints. However, position sensitive devices having four electrodes are correspondingly more expense than those having only two, and a system 100 employing them would also need the appropriate circuit to perform the conversion and produce a signal corresponding to the radial position of the centroid. Therefore, while certain embodiments employ the four-electrode position sensitive devices, such as the SD 150-7448 mentioned above, the preferred embodiments use the two-electrode versions.

In certain embodiments employing two-electrode position sensitive devices, the signal can be corrected for the arcuate motion of the rotating light footprints 355 by including a circuit that extracts the information mathematically. For example, such a circuit might read the signal at a specific point in the rectified sinusoid, or calculate a mean square root. Alternatively, the amplitude of the sinusoid can simply be minimized by increasing the radius of the wheels 140 to create a signal that varies within an acceptable range of error.

Because the spacing of the light footprints 355 produced by the slit 142 in the wheels 140 may not perfectly match the width of the light detector, two or more light footprints 355 may be incident on the PSD 160 at a time. This is not generally a problem, since the PSD responds to the centroid of the incident light. Because each light footprint 355 has the same radial distance from the axis of rotation, the centroid of two or more light footprints 355 will have a similar (but not identical) radial distance from the axis of rotation. This may need to be accounted for if the light footprints 355 are incident on the detector over a relatively large arc. In particular, if the system 100 is primary intended to measure the rate of change in torque, this may be an important effect to correct since, depending on the spacing of the light footprints 355 relative to the width of the PSD 160, the centroid's radial position may jump suddenly as a new light footprint 355 rotates onto the PSD 160. However, it will be readily apparent to those skilled in the art that the means used to correct for the arcuate motion of the light footprints 355 across the PSD 160 discussed above may be readily adapted to control for this effect as well. Alternatively, the spacing of the slits 142 can be selected in order to ensure that only a single light footprint 355 is incident on the PSD 160 at a time.

Figure 6:
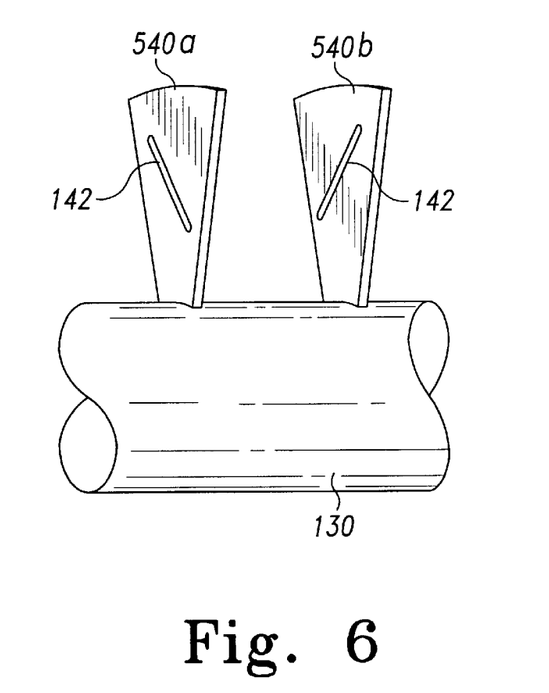
FIG. 6 is an illustration of certain elements of a system according to the present invention employing partial wheels.

It will be appreciated that the system 100 can also function when the rotating members 140 are partial wheels, having as few as one slit 142 in each, as illustrated in FIG. 6. Such systems 100 are particularly appropriate for applications to drive shafts which are not rotating. The partial wheels 540a and 540b are positioned to block the light from the light source 150 that would otherwise be incident on the light detector 160, except for light that passes through the pattern of slits 142 in each partial wheel, just as the complete wheels 140a and 140b did. Non-rotating shaft applications are also particularly suitable for systems in which the light detector 160 has a fixed position relative to one of the partial wheels 140. It will be appreciated that a pattern of slits 142 in such a partial wheel 140 that run perfectly radially will produce light footprints 355 that move in only the radial direction, and therefore do not need to be corrected for arcuate motion as discussed above.

One important potential advantage of a system 100 according to the present invention is that, because the light detector 160 can be a PSD, which responds only to the location of the centroid of the incident light, the measurement can be made independent of the intensity of light, eliminating one potential confounding variable. Thus, if the ambient light varies for any reason, such as because a near-by system is being examined by a mechanic to diagnose a problem, a system using a PSD 160 will continue to function normally.

It will also be appreciated that, while the measurement of angular displacement between the wheels 140 can be related back to torque, the system 100 can just as easily be used to measure angular displacement.

While the invention has been illustrated and described in detail in the drawings and foregoing description, the same is to be considered as illustrative and not restrictive in character, it being understood that only the preferred embodiment, and certain alternative embodiments deemed helpful in further illuminating the preferred embodiment, have been shown and described and that all changes and modifications that come within the spirit of the invention are desired to be protected.

What is claimed is:

1. A system for detecting angular displacement in a shaft, the system comprising:
    a first rotating member, having a first slit pattern therethrough, and being affixed to the shaft;
    a second rotating member, having a second slit pattern therethrough, and being affixed to the shaft;
    a light source positioned on a side of said first rotating member opposite said second rotating member;
    a light detector positioned on a side of said second rotating member opposite said first rotating member such that light from said light source which would otherwise be incident on said light detector is substantially blocked by said first and second rotating members, except for light which passes through said first and second slit patterns;
    wherein said first and second slit patterns are adapted to create a pattern of light incident on said light detector that varies according to an angular position of said first rotating member relative to said second rotating member; and
    wherein said light detector is adapted to produce a position signal responsive to a position of said pattern of light incident on said light detector.

2. The system of claim 1, wherein said position signal is responsive to a position of a centroid of said pattern of light incident on said light detector.

3. The system of claim 1, wherein said light detector is a position sensitive device.

4. The system of claim 1, wherein said first and second slit patterns each comprise at least one slit running both radially and angularly, relative to an origin of a set of radial coordinates located on an axis of rotation of the shaft.

5. The system of claim 1, wherein one of said first and second slit patterns comprise at least one slit running in a perfectly radial direction, relative to an origin of a set of radial coordinates located on an axis of rotation of the shaft.

6. The system of claim 1, wherein at least one of said first and second slit patterns consists of a plurality of slits spaced regularly about an axis of rotation of the shaft.

7. The system of claim 1,
    wherein said second slit pattern is identical to said first slit pattern when said first and second rotating members face in a common direction, and
    wherein said first rotating member faces in a direction opposite to a direction faced by said second rotating member.

8. The system of claim 1,
    wherein the shaft comprises two shaft segments connected by a torsion portion adapted to permit said shaft segments to have a relatively large angular displacement relative to one another along an axis of rotation of the shaft at a given torque; and
    wherein said first and second rotating members are affixed to the shaft at points on opposite sides of said torsion portion.

9. The system of claim 1, wherein said first rotating member is a first wheel and said second rotating member is a second wheel.

10. A system for detecting angular displacement between a first position and a second position on a shaft, comprising:
    a first rotating member, having a first slit pattern therethrough and being affixed to said first position on the shaft, the first slit pattern consisting of a series of identical first slits regularly spaced about an axis of rotation of said shaft, and each of said first slits running both radially and angularly, relative to an origin of a set of radial coordinates located on an axis of rotation of the shaft;
    a second rotating member, identical to said first wheel and affixed to said second position on the shaft, but oriented to face in the opposite direction along said shaft relative to said first rotating member;
    a light source positioned on a side of said first rotating member opposite said second rotating member;
    a position sensitive device positioned on a side of said second rotating member opposite said first rotating member such that light from said light source which would otherwise be incident on said position sensitive device is substantially blocked by said first and second rotating members, except for light which passes through said first and second slit patterns;
    wherein said first and second slit patterns are adapted to create a pattern of light incident on said light detector that varies according to an angular position of said first rotating member relative to said second rotating member; and
    wherein said light detector is adapted to produce a position signal responsive to a position of a centroid of said pattern of light incident on said light detector.

11. The system of claim 10, wherein said position sensitive device has only a single detection axis.

12. The system of claim 10, wherein said position sensitive device has a plurality of detection axes.

13. The system of claim 10,
    wherein the shaft comprises two shaft segments connected by a torsion portion adapted to permit said shaft segments to have a relatively large angular displacement relative to one another along an axis of rotation of the shaft at a given torque; and
    wherein said first and second rotating members are affixed to the shaft at points on opposite sides of said torsion portion.

14. The system of claim 10, wherein said first rotating member is a first wheel and said second rotating member is a second wheel.

15. A system for measuring the angular displacement between a first and second positions on a shaft, the system comprising:
    a first rotating member, having a first slit pattern therethrough and being affixed to said first position on the shaft, the first slit pattern consisting of a series of identical first slits regularly spaced about an axis of rotation of said shaft, and each of said first slits running both radially and angularly, relative to an origin of a set of radial coordinates located on an axis of rotation of the shaft;
    a second rotating member, identical to said first wheel and affixed to said second position on the shaft, but oriented to face in the opposite direction along said shaft relative to said first rotating member;
    a light source positioned on a side of said first rotating member opposite said second rotating member;
    a position sensitive device positioned on a side of said second rotating member opposite said first rotating member such that light from said light source which would otherwise be incident on said position sensitive device is substantially blocked by said first and second rotating members, except for light which passes through said first and second slit patterns;

wherein said first and second slit patterns are adapted to create a pattern of light incident on said light detector that varies according to an angular position of said first rotating member relative to said second rotating member; and wherein said light detector is adapted to produce a position signal responsive to a position of a centroid of said pattern of light incident on said light detector; and a circuit adapted to convert said position signal into a displacement signal corresponding to the angular displacement between said first and second rotating members that has been determined to produce a pattern of light having the position corresponding to said position signal.

16. The system of claim 15, wherein said first and second rotating members are a first and second wheel, respectively.

17. The system of claim 15, wherein said position sensitive device has a single detection axis.

18. The system of claim 15, wherein said position sensitive device has a plurality of detection axes.

19. The system of claim 15, wherein the shaft comprises two shaft segments connected by a torsion portion adapted to permit said shaft segments to have a relatively large angular displacement relative to one another along an axis of rotation of the shaft at a given torque; and wherein said first and second rotating members are affixed to the shaft at points on opposite sides of said torsion portion.

20. A system for measuring torque in a shaft, comprising:

a first rotating member, having a first slit pattern therethrough, the first slit pattern consisting of a series of identical first slits regularly spaced about an axis of rotation of said shaft, and each of said first slits running both radially and angularly, relative to an origin of a set of radial coordinates located on an axis of rotation of the shaft;

a second rotating member, identical to said first rotating member, but oriented to face in the opposite direction along said shaft relative to said first rotating member;

a light source positioned on a side of said first rotating member opposite said second rotating member;

a position sensitive device positioned on a side of said second rotating member opposite said first rotating member such that light from said light source which would otherwise be incident on said position sensitive device is substantially blocked by said first and second rotating members, except for light which passes through said first and second slit patterns, said position sensitive device being operative to produce a position signal determined by the torque; and a circuit adapted to convert said position signal into a torque signal corresponding to the torque that has been determined to produce a pattern of light having the position corresponding to said position signal.

21. The system of claim 20, wherein said first and second rotating members are a first and second wheel, respectively.

22. The system of claim 20, wherein said position sensitive device has a single detection axis.

23. The system of claim 20, wherein said position sensitive device has a plurality of detection axes.

24. The system of claim 20, wherein the shaft comprises two shaft segments connected by a torsion portion adapted to permit said shaft segments to have a relatively large angular displacement relative to one another along an axis of rotation of the shaft at a given torque; and wherein said first and second rotating members are affixed to the shaft at points on opposite sides of said torsion portion.

25. A method of detecting angular displacement between a first position and a second position on a shaft, the method comprising the steps of:

providing a first rotating member affixed to the first position and a second rotating member affixed to the second position, each of the first and second rotating members having at least one slit therethrough;

determining a relationship between angular displacement between the first and second positions and a pattern of light produced by filtration of substantially planar light through at least one slit in each of the first and second rotating members;

observing a position of the pattern of light to determine the angular position of the first rotating member relative to the second rotating member.

26. The method of claim 25, wherein the observing the pattern of light is substantially limited to observing a radial position of the pattern of light relative to an axis of rotation of said first and second rotating members.

27. The method of claim 25, further comprising:

determining a relationship between angular displacement between the first and second positions and a torque on the shaft.

28. The method of claim 27, further comprising:

relating the angular position of the first rotating member relative to the second rotating member back to a torque on the shaft using the relationship.

29. A method of detecting torque in a shaft, the method comprising the steps of:

providing a first rotating member and a second rotating member each having at least one slit therethrough;

determining a relationship between a torque on the shaft and a pattern of light produced by filtration of substantially planar light through at least one slit in the first rotating member and at least one slit in the second rotating member; and observing a position of the pattern of light to determine the angular position of the first rotating member relative to the second rotating member.

30. The method of claim 29, further comprising:

relating the angular position of the first rotating member relative to the second rotating member back to a torque on the shaft using the relationship.

31. The method of claim 29, wherein the observing the pattern of light is substantially limited to observing a radial position of the pattern of light relative to an axis of rotation of said first and second rotating members.

32. A method of measuring torque in a shaft, the method comprising the steps of:

providing a first rotating member and a second rotating member each having at least one slit therethrough;

determining a relationship between a torque on the shaft and a pattern of light produced by filtration of substantially planar light through at least one slit in the first rotating member and at least one slit in the second rotating member;

observing the pattern of light to determine the angular position of the first rotating member relative to the second rotating member;

relating the angular position of the first rotating member relative to the second rotating member back to a torque on the shaft using the relationship; and wherein the observing the pattern of light is substantially limited to observing a radial position of the pattern of light relative to an axis of rotation of said first and second rotating members.

* * * * *